May 19, 1931. J. E. DUNLAP 1,806,337
VEHICLE
Filed Aug. 14, 1929 3 Sheets-Sheet 2
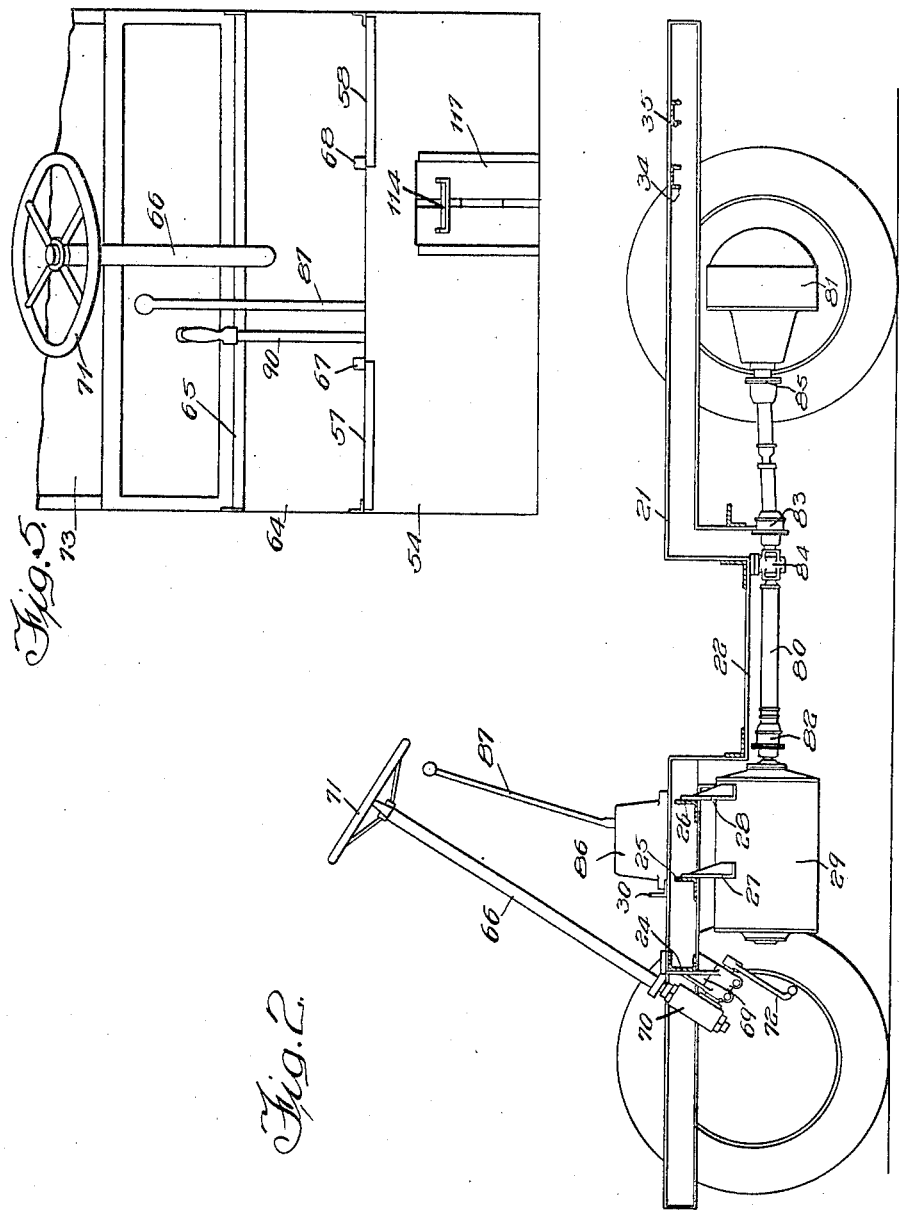
Inventor:
James E. Dunlap May 19, 1931. J. E. DUNLAP 1,806,337
VEHICLE
Filed Aug. 14, 1929 3 Sheets-Sheet 3
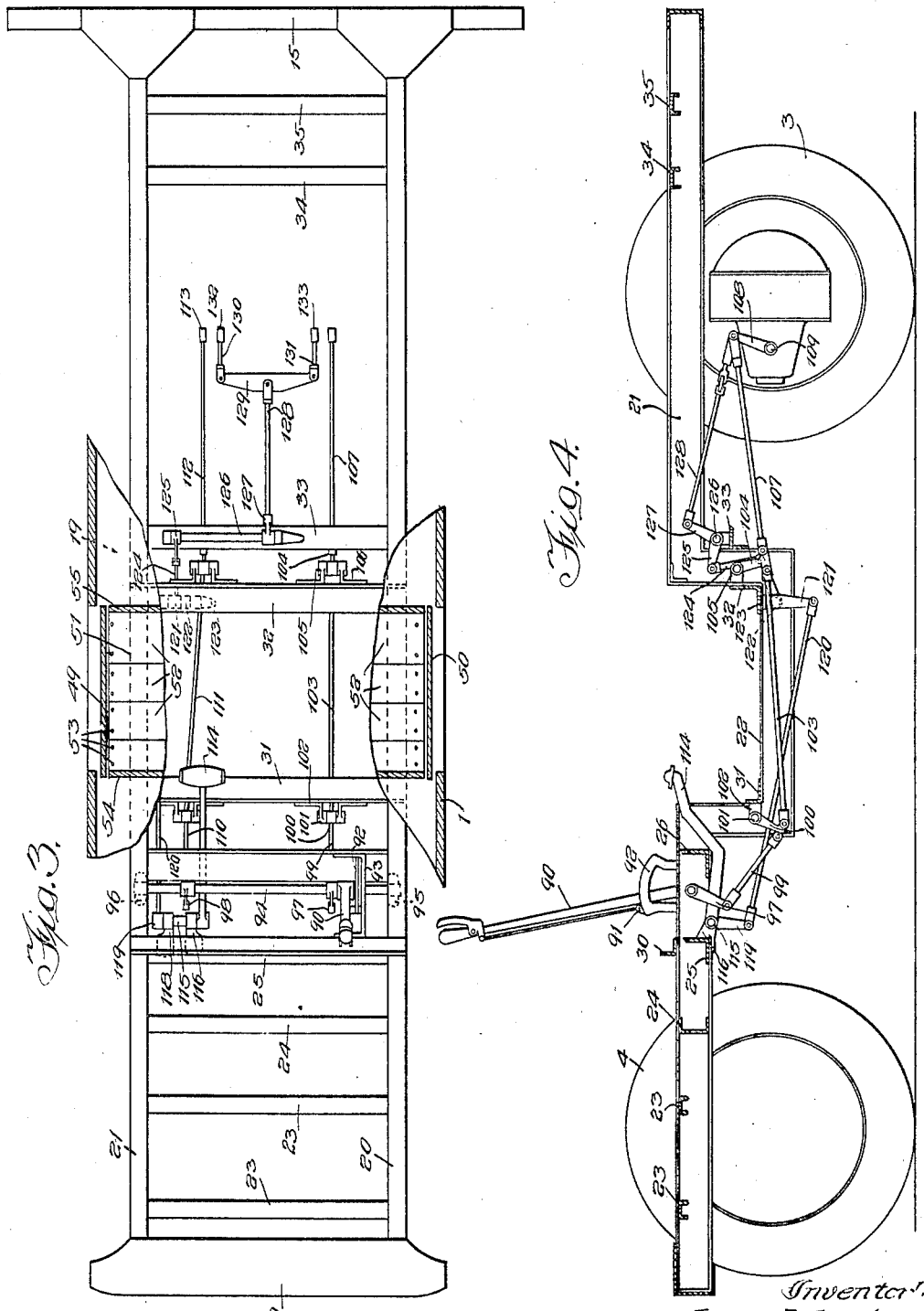
Witness:
William P. Kilroy
Inventor:
James E. Dunlap Patented May 19, 1931

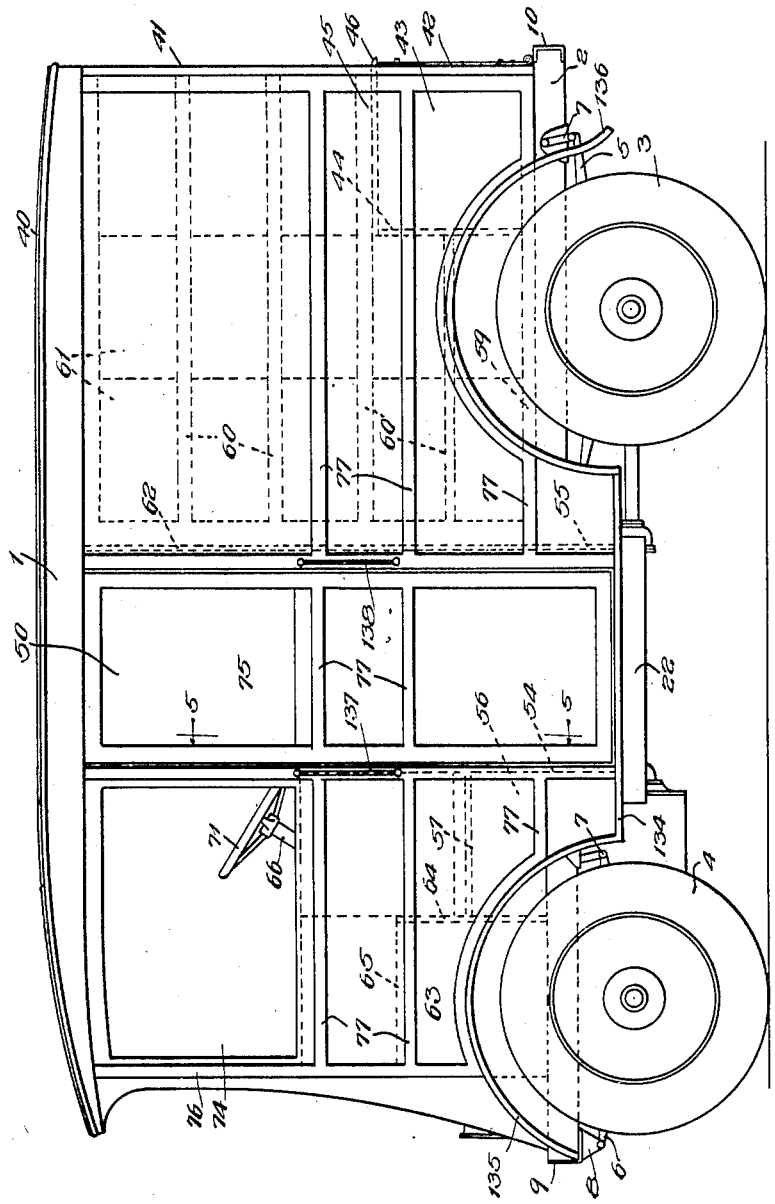

1,806,337

UNITED STATES PATENT OFFICE

JAMES E. DUNLAP, OF CHICAGO, ILLINOIS, ASSIGNOR TO WALKER VEHICLE CO., OF CHICAGO, ILLINOIS, A CORPORATION OF ILLINOIS

VEHICLE

Application filed August 14, 1929. Serial No. 385,835.

This invention relates in general to vehicles, more particularly to vehicles of the type employed in the delivery of milk, bakery goods, and the like.

Dairy companies, bakeries and other companies which make deliveries from house to house have heretofore employed horse drawn vehicles in this class of service. In some instances the horse drawn vehicles have been replaced by motor driven vehicles of the usual type.

These motor driven vehicles have not speeded up the delivery of the commodities from house to house to the extent that it was hoped that they would for the reason that it was necessary for the driver, who was also a delivery man, to climb into and out of a rather inaccessible driving seat whenever it was necessary to move the vehicle from house to house. The driver's seat was usually located rather high up in the air so that it was necessary for the driver to climb into the vehicle and in the case of a milk wagon of this type it was necessary for him to find a place for his delivery tray before starting the vehicle in motion.

In an effort to overcome this difficulty vehicles have been provided heretofore in which a cross aisle is provided immediately to the rear of the driving controls of the vehicle, that aisle being located at a low level so that the driver could step directly into it from the ground or pavement on which the vehicle is standing. This improvement afforded easy access in and out of the vehicle, except for the control lever and foot brakes of the vehicle which projected into the aisle space obstructing it to some extent and making the transfer of storage cases through the aisle a very difficult matter.

In my present invention I have provided a new and improved delivery vehicle of the type in which a transverse aisle or passageway is located at a low level so that it may be readily entered from the ground or pavement on which the vehicle is standing, and in which this transverse aisle is entirely free from obstructions which hinder the movement of articles through it.

Inasmuch as vehicles of this type are frequently stopped and usually driven only a short distance between stops it is preferable that the vehicle be arranged so that the driver can operate it safely while standing thereby eliminating the necessity of the operator sliding himself into a seat behind and between the control levers of the vehicle before starting it on its way. Accordingly as a further object of my invention I have provided a vehicle in which the control levers and steering apparatus are located in such a position and at such height as to permit the driver to safely operate the vehicle from a standing position.

To this end I have located the steering controls and motor controls of the vehicle in the central portion of the vehicle immediately forward of the transverse aisle, and have provided a pocket in the forward wall of that aisle into which the foot brake pedal projects, the pocket giving easy access to the pedal at the same time permitting its location in such a position that it does not obstruct or block the aisle.

On either side of the control levers of the car I have provided a service rack or shelf on which the driver may place his delivery tray. This rack is located well above the floor of the aisle so that objects in the tray may be picked up by the operator in standing position without making it necessary for him to bend over and take the objects off the floor.

In the case of a milk wagon, the driver may conveniently locate the storage trays from which he is delivering milk and cream on the service racks, and remove the bottles from the trays and place them in his delivery carrier in a convenient and handy manner.

Because of the relatively short distance that a delivery wagon of this type is called upon to run in covering its route, and because of the quietness of operation achieved in electrically driven vehicles, I prefer to employ an electric drive for the vehicle. The motor for driving the vehicle in the preferred embodiment of my invention is suspended beneath the frame of the vehicle and immediately forward of the transverse aisle, and is connected to the rear or driving wheels by a shaft supported on suitable bearings mounted below the drop portion of the frame, however, I am not to be limited to this particular arrangement as the motor may also be mounted to the rear of the aisle within the teachings of my invention.

The batteries for driving this motor are located in a battery compartment in the extreme forward end of the vehicle, that compartment preferably being provided with a removable cover which is flat and which may be used as an additional service rack on which the driver may place containers from which he is making deliveries, although if desired, doors may be provided to give access to this compartment from the outside of the vehicle. If necessary to equip the vehicle with a larger battery than can be housed in this forward battery compartment, I have provided a second battery compartment at the extreme rear end of the vehicle, that compartment having a door in the rear of the body of the vehicle through which access to the compartment is obtained.

The batteries located in one or both of these compartments may be supported directly upon transverse channels in the frame of the vehicle and are, therefore, entirely independent of the body of the vehicle, or they may be supported in the body of the vehicle.

The rear vertical wall of the front battery compartment projects above the service rack formed immediately forward of the operating aisle, and serves as an instrument board for the vehicle. The steering column which is also mounted on a transverse channel of the frame, is projected through a suitable slot in this instrument board on the meridian line of the vehicle.

The ampere-hour meter, switches, and other equipment commonly provided on vehicles of this type are mounted on the instrument board immediately adjacent the steering column, so that the central portion of the instrument board is made to contain all of the instruments provided on the vehicle. This leaves the outward ends of the instrument board entirely free so that cases or cartons placed on the service rack adjacent the operating aisle will not interfere in any way with the instruments on the instrument board.

The main storage racks of the vehicle are preferably located to the rear of operating aisle and provide storage space located between the rear battery box and the operating aisle and also additional storage space over the rear battery box. By locating suitable trays or racks in this space the capacity of the vehicle can be filled up to the required amount without sacrificing either accessibility or convenience in handling of the products stored in the vehicle.

Preferably the vehicle is provided with a body of the closed type, that body having doors registering with the operating aisle and hung on the body in such a manner as to be disposed outside of the framework or chassis of the vehicle.

These doors are slidable to the front or rear to permit easy access to the operating aisle of the vehicle.

To acquaint those skilled in the art with the teachings of my invention, I have shown a preferred embodiment of it in the accompanying drawings in which:

Figure 1 is an elevational view of the completely assembled vehicle;

Figure 2 is a cross sectional view of the chassis taken along its meridian line and showing the motor, motor control, and steering column of the vehicle;

Figure 3 is a plan view of the chassis showing the braking arrangement;

Figure 4 is an elevational view of the chassis also showing the braking arrangement;

Figure 5 is a cross sectional view of the body taken substantially along the line 5—5 of Figure 1.

Referring to Figure 1 now in more detail it will be seen that the body 1 which is a canopy type delivery body is supported upon the chassis or framework 2, which chassis is in turn supported upon the driving wheels 3 and the steering wheels 4, by the springs 5 and 6 respectively.

The springs are mounted upon the axles of the vehicle, not shown, in the usual manner and the frame 2 supported on the spring 5 by the usual shackles 7 and 8. The frame 2 is provided with a front bumper 9 which is a channel iron projecting forward of the front wall of the vehicle, and also with a rear bumper 10 also a channel iron which is projected rearwardly of the rear wall of the vehicle.

As will be best seen in Figures 2, 3 and 4, the frame comprises the side channels 20 and 21, which are provided with a dropped portion 22 located substantially in the middle of the side rails. These side rails 20 and 21 are preferably channel iron and are held together by the bumpers 9 and 10, and also by a plurality of transverse members.

The transverse members comprise the channels 23 which are located near the forward end of the frame and serve also as a support for the batteries located in the forward battery compartment, as will presently appear. Immediately to the rear of the channels 23 is a second channel 24 which serves as a mounting support for the steering column of the vehicle and as a member for holding the side channels 20 and 21 together.

Immediately to the rear of the channel 24 I have located two angle irons 25 and 26, the forward one of which serves as a mounting support for the foot brake mechanism, and the rear one as a mounting support for the emergency brake lever. These channels 25 and 26 also serve as mounting plates for the brackets 27 and 28 of the motor 29.

A smaller angle iron 30 is mounted on the top of the side channels 20 and 21 adjacent the channel 25 and serves as a support for the controller of the vehicle. The transverse aisle through the vehicle is defined by the dropped portion 22 of the side channels 20 and 21, and also by the transverse angle irons 31 and 32, both of which serve also as mounting supports for the braking mechanism. An additional angle iron 33 mounted on the rearward side of the dropped portion 22 of the frame also serves as a mounting support for the foot brake mechanism. Cross channels 34 and 35 located near the rear bumper 10 serve as mounting support for the battery contained in the rear battery box of the vehicle.

The frame so constructed and braced forms a rigid support for the body 1, which is attached thereto by suitable bolts, not shown.

The body illustrated in the drawings is of the type suitable for the delivery of milk, bakery goods and the like, and comprises a closed body structure having a roof 40 extending over the full length of the vehicle. The back wall 41 is preferably closed solid except for the door 42 through which access to the battery compartment 43 may be had, but if desired, doors leading into the interior of the body may be provided in the back wall 41. This battery compartment 43 located at the rear of the vehicle is separated from the produce storage space by the vertical wall 44 disposed at the front end of the battery compartment and by the top wall or ceiling 45 which defines its upper limit. This wall 45 projects at 46 beyond the rear wall of the vehicle for a slight distance to form an eave over the upper edge of the door thereby preventing the entrance of rain into the battery compartment.

Access into the interior of the body 1 is given through the doors 49 and 50 which are located on opposite sides of the body above the dropped portion 22 of the frame. These doors open into a cross aisle 51 which is floored by floor boards 52 laid adjacent the top portion 22 of the frame and attached thereto by suitable screws or bolts 53.

The front and rear limits of the aisle 51 are defined by the vertical wall 54 located at the front edge of the aisle and by the rear vertical wall 55.

The front wall 54 projects above the floor level of the frame to form a rear wall for the control compartment 56 and a rear support for the service racks 57 and 58 which are disposed above this control compartment and on opposite sides of the vehicle.

The rear vertical wall 55 terminates at the upper surface of the frame of the vehicle flush with the upper level of the rear compartment floor boards 59. This rear compartment which extends back from the rear side of the cross aisle 51 to the front edge 44 of the battery compartment 43 may be provided with suitable racks 60, for receiving the cases or trays in which the produce to be delivered from the vehicle are stored in transit. The cases 61 shown in Figure 1 of the drawing by way of example are assumed to be milk bottle cases such as are commonly employed in the delivery of bottles of milk, and the racks 60 are arranged to receive the cases of this size. Obviously if bakery goods are to be delivered from the vehicle the cases 61 would be of the type most commonly employed for the delivery of such goods and the rack 60 would necessarily be altered to accommodate these particular cases. I am not therefore to be limited to any partitcular type or kinds of racks within the rear storage compartment of the vehicle since these racks will be tailored to meet the requirements just stated by the use to which the vehicle is to be put.

If desired the rear compartment can be closed from the aisle by the door 62 which is made in a plurality of small sections, preferably three, and arranged to slide from side to side to give access to the compartment. The use of such a door prevents warm air from entering the compartment and melting the ice employed to keep the milk cool if the vehicle is used for a milk wagon, and prevents dirt and dust from entering the compartment and contaminating bakery goods if the vehicle is used for that purpose. The door 62 will necessarily be modified to meet the requirements placed upon it by the various uses to which the vehicle may be used and I am not to be limited to any specific kind of door as there are many arangements which can be satisfactorily used for this purpose.

The forward battery box 63 is closed in by a rear wall 64 which serves as a forward support for the service racks 57 and 58 and as a front wall for the control compartment 56. The battery box 63 is closed by the cover 65 which serves also as a forward service rack upon which cases or trays from which goods are being delivered can be lifted. This cover 65 is removable to give access to the battery compartment 63.

The rear wall 64 of the battery compartment serves also as an instrument board upon which are mounted the usual instruments and switches employed in an electrical vehicle.

These instruments are not shown in the drawings. The steering column 66 projects through this instrument board at the center thereof, and the instruments are preferably grouped around the steering column in such a manner that they do not extend outward beyond the stop blocks 67 and 68 which serve as side rails for the service trays 57 and 58, so that the instruments will not be damaged by racks or carriers placed upon the service trays.

The steering column 66 is mounted upon the cross channel 24 of the frame by a bracket 69. The steering column is also provided with a casing 70 containing the gears or cam and lever employed to transmit motion from the steering wheel 71 to the steering crank 72 from which crank the motion is transmitted to the steering mechanism of the wheels, not shown, by the usual rod and lever arrangements. Any preferred type of steering control can be incorporated in the casing 70 within the teachings of this invention.

The steering column 66 is supported on the frame at an angle so that the steering wheel 71 is disposed in juxtaposition to the cross aisle 51 of the vehicle and at such a height that it can be easily manipulated by a driver standing in that aisle.

The front wall of the vehicle is provided with the wind shield 73 which is made of glass or other suitable transparent material, and the forward side walls of the vehicle are provided with the transparent panels 74 and the doors 49 and 50 with the transparent panels 75 so that the driver standing in the aisle of the vehicle behind the steering wheel 71 has an unobstructed view forward of the vehicle.

The corner posts 76 of the front side of the vehicle are small so that they do not seriously obstruct the driver's view of the roadway. Except for the glass panels the body of the vehicle is entirely closed by solid walls preferably of wood or sheet metal, and the lower section of the doors 49 and 50 are likewise made solid. To add to the appearance of the vehicle, panelling strips 77 may be added to the side walls, these strips also serving to reinforce the side walls and prevent undue vibration of them.

The vehicle shown in the drawings is driven by the electric motor 29 which is swung from the cross angles 25 and 26 of the frame by the brackets 27 and 28 attached respectively thereto. The motor 29 is thus located beneath the frame and ahead of the drop portion 22. The motor is connected by the drive shaft 80 to the driving axle 81 of the vehicle, this axle containing the usual differential gearing. The shafting 80 is connected to the motor by the universal joint or flexible coupling 82 and is also provided with a flexible coupling 83 located adjacent to the rear edge of the drop section 22 of the frame. A bearing 84 serves to support the shaft section disposed between these two flexible couplings. A third flexible coupling or a universal joint 85 is located adjacent to the differential housing 81 to give the necessary flexibility to the driving shaft to compensate for unevenness of the pavement over which the vehicle is driven.

The motor 29 is controlled by the motor control 86 which is mounted on the framework immediately above the motor. This control 86 may be any type of control for an electric vehicle and is provided with the control lever 87 which projects upward through the upper surface of the control compartment 56 adjacent to the steering column 66 to thereby give the driver ready access to the controls of the vehicle. This lever 87 is disposed at an angle so that its upper end is adjacent to the forward limit of the operating aisle to thereby make it more accessible to the driver. As is customary with electric vehicles of this kind, this lever controls both the forward and rearward movement of the vehicle.

The braking arrangement of the vehicle, shown in detail in Figures 3, 4, and 5, comprises a foot braking system and an emergency or a parking brake system. The emergency brake comprises a lever 90 having a pawl 91 engaging an arcuate plate 92 located in the control compartment. The lever 90 projects upward from this compartment to its upper surface and lies adjacent to the motor control lever 87. The arcuate plate 92 and the lever mechanism of the emergency brake are supported upon a bracket 93 which is attached to the cross angles 25 and 26 of the frame.

The lever 90 is pivoted on a cross shaft 94 which runs from side frame member 20 to side frame member 21 being journaled at 95 and 96 in suitable journal boxes located on the frame members.

This shaft 94 is provided with the levers 97 and 98 which are keyed to the shaft and operated by a rotation of it, that rotation being produced by a rearward or forward movement of the control lever 90.

A brake rod 99 is pivoted to the lever 97 and extended downward and rearward therefrom to the bell-crank lever 100 which is pivoted at 101 to a bracket 102 located upon the cross angle 31 of the frame. A second brake rod 103 connects this bell-crank lever 100 to a second lever 104 which is pivoted at 105 to a bracket 106 located upon the cross angle 32 of the frame that angle being disposed at the rear of the cross aisle 51 of the vehicle. The brake rod 103 is disposed beneath the flooring 52 of the cross aisle 51. The lever 104 is connected by a brake rod 107 to the emergency brake operating lever 108 located on the rear axle of the vehicle and connected by the shaft 109 to the emergency brake band mechanism. Any preferred type of emergency brake band mechanism may be employed and operated by this lever arrangement.

Similarly the lever 98 is connected by brake rods 110, 111, and 112 to the emergency brake operating lever 113 likewise located on the rear axle assembly and operative to control the emergency brake band for the other rear wheel of the vehicle.

The service brake of the vehicle is a foot brake operated by pressing the foot pedal 114. This pedal is pivoted at 115 to a bracket 116 supported on the cross member 25 of the frame.

The pedal 114 is located in a pocket 117 disposed in the vertical wall 54 which defines the forward limit of the operating aisle. As may be seen from Figure 3, the front wall 54 is located rearwardly of the transverse angle bar 31. This places substantially the entire brake pedal 114 in the pocket 117. The pocket 117 enables the foot of the operator to be placed upon the brake pedal and at the same time permits mounting that brake pedal so that it is substantially flush with the wall section 54 so that it does not project into and block the operating aisle of the vehicle. The foot lever pivot rod 115 extends through the bracket 116 and the bracket 118 both mounted on the cross member 25 of the frame and terminates outside the member 118. A lever 119 is keyed to this projection of the rod 115 and the brake rod 120 is pivoted to this lever and extended backward under the drop portion 22 of the frame to the lever 121 which is pivoted at 122 to the bracket 123 supported on the cross member 32 of the frame. This lever 121 is connected by the link 124 to the lever 125 which is keyed to the pivot rod 126, that rod being pivotally supported in suitable journals mounted upon the cross angle 33.

Brake operating lever 127 is also pivoted to this rod 126 on the meridian line of the vehicle and the brake operating rod 128 extends from this lever rearwardly to the equalizing bar 129. This bar is connected by the links 130 and 131 to the service brake operating levers 132 and 133 respectively, those levers being connected in the usual manner to the service brakes located on the rear wheels of the vehicle.

By this arrangement of levers and rods the pressure put on the foot pedal 114 by the operator is transmitted to the rear brakes of the vehicle, the equalizing bar 129 insuring that the pressure applied to the two rear brakes will be equal at all times.

From the foregoing it will be apparent that I have provided a vehicle in which a transverse aisle is located at such a height that it can easily be entered from the pavement. To facilitate entrance to the vehicle I have provided the running board 134 on either side of the vehicle, that running board being connected to the frame and serving as a support for the fenders 135 and 136 which are located over the front and rear wheels, respectively, of the vehicle. Suitable hand rails 137 and 138 located on the sides of the door vehicle facilitate entrance to the vehicle. The cross aisle 51 is entirely free of obstruction so that the movement of cases or carriers of materials through it may be easily accomplished.

In operation, the main supply of produce to be distributed is stored in the racks in the rear of the vehicle, and the storage cases are transferred to the service racks 57 and 58 and to the service rack 65 as needed. By this arrangement, in the case of delivery of milk, only a small supply of milk is set outside of the closed storage compartment, and that supply is quickly exhausted before the warm air which is bound to strike it has had sufficient time to melt the ice in which it is packed.

The driver having free access to the operating aisle from either side of the vehicle by a single step from the ground can quickly enter and leave the vehicle and the delivery of produce is thereby speeded up. It is not necessary for the driver to put himself into a driving seat before starting the vehicle, and here again considerable time is saved.

While I have chosen to show a preferred embodiment of my invention, I have done so by way of example only as there are many modifications and adaptations which can be made by one skilled in the art without departing from the teachings of the invention.

Having thus complied with the statutes and shown and described a preferred embodiment of my invention, what I consider new and desire to have protected by Letters Patent is pointed out in the appended claim.

What is claimed is:

In a motor delivery vehicle the combination of a body provided with a transverse aisle therethrough forming a passageway for the operator of the vehicle, there being steering and control mechanism at the front of the aisle accessible to the operator standing in the aisle, a front wall for the lower part of the aisle, there being a recess in the front wall for receiving the foot of the operator and a vehicle controlling pedal disposed in said recess and accessible for manipulation by the foot of the operator standing in said aisle.

In witness whereof, I hereunto subscribe my name this 31st day of July, 1929.

JAS. E. DUNLAP.